US006511264B2

(12) United States Patent
Ripley

(10) Patent No.: US 6,511,264 B2
(45) Date of Patent: Jan. 28, 2003

(54) ADJUSTABLE INSERT SEAT

(75) Inventor: Frank R. Ripley, Machesney Park, IL (US)

(73) Assignee: Ingersoll Cutting Tool Company, Rockford, IL (US)

(*) Notice: Subject to any disclaimer, the term of this patent is extended or adjusted under 35 U.S.C. 154(b) by 20 days.

(21) Appl. No.: 09/773,862

(22) Filed: Feb. 1, 2001

(65) Prior Publication Data

US 2002/0102137 A1 Aug. 1, 2002

(51) Int. Cl.[7] .............................. B23C 5/20; B26D 1/12

(52) U.S. Cl. ............................ 407/36; 407/43; 407/44; 407/47

(58) Field of Search .............................. 407/35, 36, 37, 407/38, 40, 43, 44, 48, 49, 50, 54, 55, 113, 114, 115, 116, 117

(56) References Cited

U.S. PATENT DOCUMENTS 2,385,750 A 9/1945 Weddell
3,708,843 A 1/1973 Erkfritz
4,092,082 A * 5/1978 Severson .................... 407/40
4,309,132 A 1/1982 Adamson et al.
4,363,576 A * 12/1982 Zweekly ...................... 407/50
4,547,100 A * 10/1985 Naccarato et al. ............ 407/39
5,667,343 A 9/1997 Hessman et al.
5,863,156 A 1/1999 Satran et al.
6,033,157 A * 3/2000 Satran et al. ................. 407/37
6,056,484 A 5/2000 Mitchell et al.

FOREIGN PATENT DOCUMENTS

EP 0443773 * 8/1991

* cited by examiner

*Primary Examiner*—Henry Tsai
(74) *Attorney, Agent, or Firm*—Fitch, Even, Tabin & Flannery

(57) ABSTRACT

Disclosed is a "nest" or seating element for tangentially-mounted "on-edge" cutting inserts for face mills which shares a peripheral pocket of the face mill with the cutting insert, and which facilitates the adjustment of the cutting insert it supports by virtue of its resilience in the axial direction of the face mill.

6 Claims, 3 Drawing Sheets

24 24 30 20 24 64 52 56 48 56 22

ADJUSTABLE INSERT SEAT

This invention relates to milling tools and, in particular, to provision for aligning the multiple cutting bits or inserts of a face mill to place their face-cutting edges with accuracy into a common plane perpendicular to the rotational axis of the tool.

BACKGROUND OF THE INVENTION

The problem of precisely aligning the multiple cutting bits of a face mill into a common plane perpendicular to the rotational axis of the cutter is as old as replaceable cutting bits, and not less demanding with the advent of hard metal cutting inserts in lieu of the earlier tool-steel cutting plates. Such alignment is, of course, essential to production of a smooth surface unmarked by the trace of an axially protruding cutting edge.

Most systems heretofore provided have involved some form of screw-driven wedging action to shift the cutting edge of the removable cutting bit axially toward the cutting plane and then clamping the bit against axial movement from the cutting forces. Few such systems were characterized by resilient resistance to the height adjustment of the cutting edges with the result that a great deal of tool-room time and skill was required to bring about the desired planar alignment of the cutting edges.

SUMMARY OF THE INVENTION

This invention provides a unique form of removable support, or "nest", as it is sometimes called in the trade, for the cutting insert, which is resilient in the axial direction of the cutter body within its pocket in the periphery of the cutting tool. More precisely, it is formed so as to be resiliently extensible axially of the cutter body so as to provide a following adjustment to the movement of a wedge element, in this case a barrel-screw, in both axial directions.

BRIEF DESCRIPTION OF THE DRAWINGS

The invention and its application are illustrated in the accompanying drawings, in which.

DETAILED DESCRIPTION OF THE INVENTION

Figure 1:
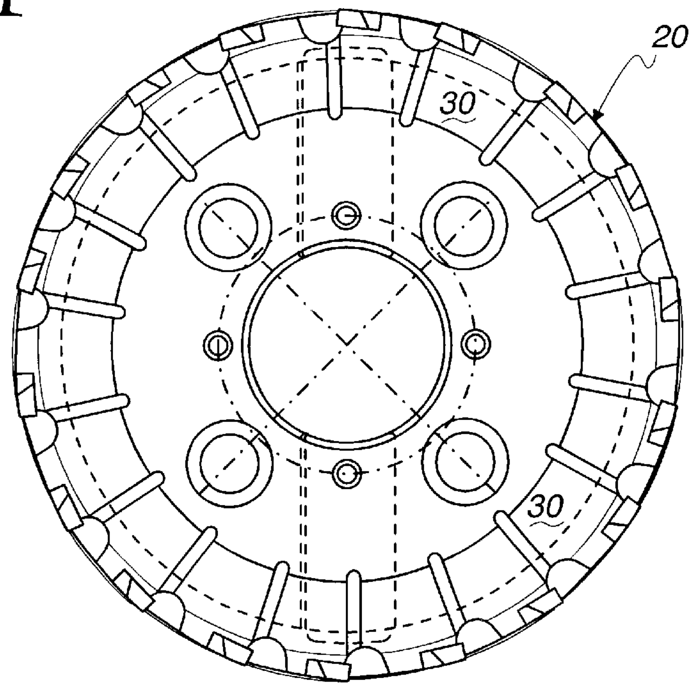
FIG. 1 is an elevation of one type of face mill to which the invention has been applied.
Figure 2:
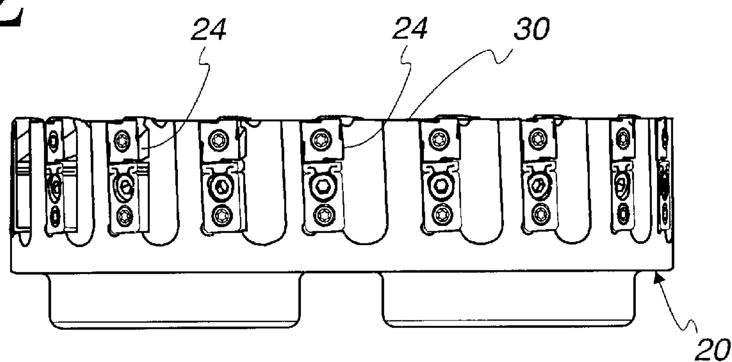
FIG. 2 is a side view of the face mill in which the several inserts are seen more fully, and in their relation to the insert seat, or "nest", of the invention.
Figure 3:
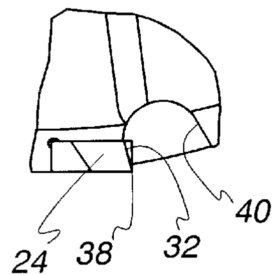
FIG. 3 is a fragmentary enlargement of a portion of FIG. 1.
Figure 4:
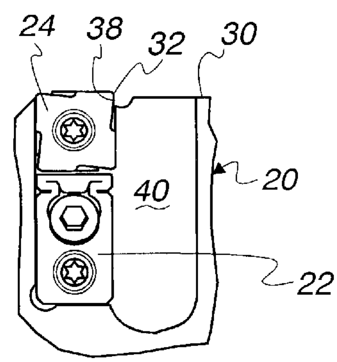
FIG. 4 is a fragmentary enlargement of a portion of the side view of FIG. 2, corresponding to the fragment of FIG. 3.
Figure 10:
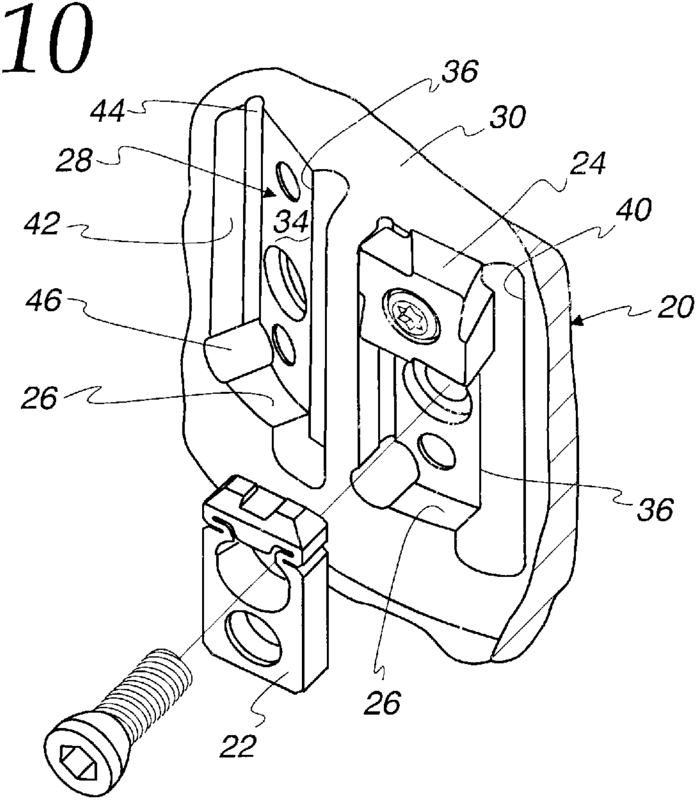
FIG. 10 is an exploded assembly view of the cutter body, insert seat, and the wedge-like adjusting screw for raising and lowering the support of the insert, and also showing the insert pocket in detail.

An embodiment of the invention in presently preferred form is incorporated in the face mill 20 of FIGS. 1 and 2, and is focused upon in that context in the fragmentary enlargements of FIGS. 3,4, and 10.

The invention resides in the seating element 22 and its relation to the body of the face milling cutter 20 and to the "on-edge" or tangentially-mounted cutting insert 24 which is supported by the seating element 22 against axial cutting force reaction upon the insert. The seating element 22, sometimes also referred to in the trade as a "nest", also serves to adjust the position of the cutting insert incrementally in the axial direction of the body of the cutter, as well as to transmit the axial cutting load reaction to a wall 26 at the "blind" end of a peripheral pocket 28 in the cutter body 20 (FIG. 10) in which the cutting insert 24 and its associated seating element 22 occupy a stacked relation.

The peripheral pocket 28 is rectangular in overall shape with its long axis oriented approximately axially of the cutter body 20, but leaning slightly rearwardly relative to the cutting direction, to provide automatic clearance for the axially protruding insert 24. The pocket 28 is open at the face 30 of the cutter body 20 for the protrusion of the face-cutting edge 32 of the cutting insert 24 beyond the plane of the face 30 of the cutter body, and the flat seating surface 34 of the pocket is inclined inwardly from perpendicularity to a radial plane through its leading edge 36 (FIG. 1, bottom center) to provide clearance for the side-cutting edge 38 of the cutting insert.

Forwardly of each pocket 28 in the cutting direction, the cutter body is milled more deeply than the flat seating surface 34 of the pocket to provide a gullet 40 to receive the chips generated by the two cutting edges 32 and 38 of the inserts 24 as the cutter body is fed in a direction approximately perpendicular to its rotational axis, which is typically tilted slightly in the feeding direction.

The seating surface 34 of each pocket 28 is separated from the rear wall 42 of the pocket by a groove 44 which provides milling clearance. A blind hole 46 disposed approximately radially of the cutter body at the juncture of the rear wall 42 and bottom wall 26 of the pocket provides run out clearance for the end milling of those surfaces.

The insert seating element 22, seen enlarged in FIGS. 5 to 9 of the drawings, is a generally rectangular, flat block of tool steel which is machined in a somewhat intricate configuration suited to its function of providing resiliently adjustable but firm support to the cutting insert 24 stacked above it in the pocket 28.

In its more mundane aspects, the seating element is bored and countersunk at 47 to receive a countersink headed fastener 48 to secure it to the cutter body 20. The fastener is preferably a countersink screw threadable into the cutter body 20 at a slight deviation from perpendicular to the seating surface 34 of the pocket 28 in a plane bisecting the right-angle corner between the rear wall 42 and the bottom wall 26 of the pocket. This angular deviation, evident from FIGS. 11 and 12, urges the seating element 22 firmly into contact with all three mutually rectilinear surfaces of the pocket, viz., the seating surface 34, the rear wall 42, and the bottom wall 26.

Above the countersunk bore 47, the seating element 22 is bored on an upwardly inclined axis to provide, within a central aperture 49, a semi-cylindrical seat 50 for a barrel-headed adjusting screw 52 threaded into the cutter body 20 at an upward inclination of 15° from a perpendicular to the seating surface 34. Opposite the cylindrical seat 50, the aperture 49 is machined to define an insert-engaging pad 54 supported resiliently from the tower main body of the seating element 22 by a pair of serpentine columns 56. The S-shaped columns 56 are formed by an incision 58 of the seating element inwardly from its side edges, and a further incision 60 therein outwardly from the aperture 49 in parallel spaced relation to the first-mentioned incision 58.

The machining of the aperture 49 and the incisions 58 and 60 is performed preferably by wire electrical-discharge machining under computer numerical control, providing also a plane surface on the underside of the pad 54 aligned perpendicularly to the side edges of the seating element 22.

Figure 5:
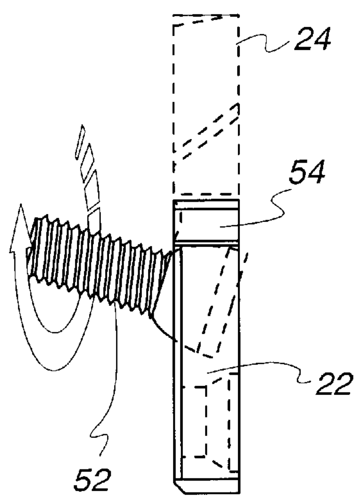
FIG. 5 is a side view of the insert seat indicating the manner of extending the insert seat to elevate the insert, shown, as in phantom, by broken lines.
Figure 6:
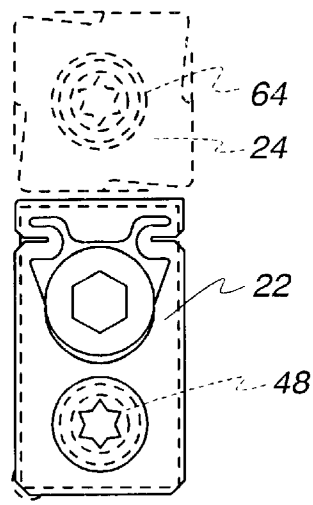
FIG. 6 is a frontal elevation of the combination of FIG. 5.
Figure 7:
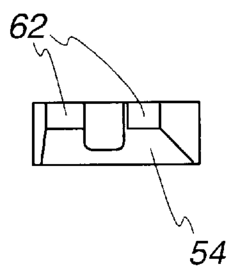
FIG. 7 is a top view of the insert seat alone, as presented to the overlying cutting insert.
Figure 8:
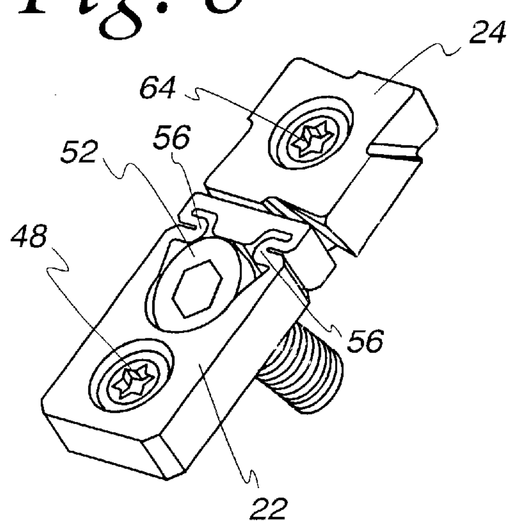
FIG. 8 is an oblique view of the insert seat and insert combination of FIGS. 5 and 6.
Figure 9:
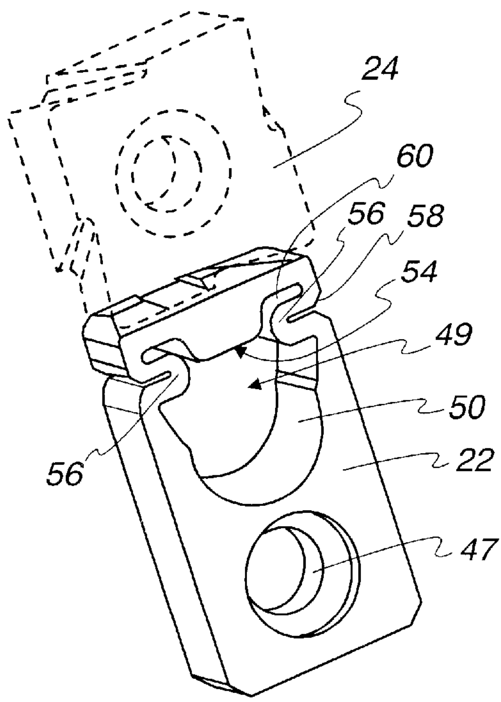
FIG. 9 is an enlarged oblique view of the combination of FIGS. 5 and 6, with attaching and adjusting screws removed to show the surfaces with which they interact, and with the insert shown in phantom outline to illustrate the contact between the insert and the insert seat.

As shown in FIG. 5, the turning of the adjusting screw 52 into the cutter body 20, with the rim of its barrel-shaped head nested in the semi-cylindrical seat 50, will effect the engagement of the taper of the screw head with the planar undersurface of the pad 54. Further turning in of the screw 52 lifts the pad 54, and with it, the overlying cutting insert 24, to the extent permitted by the flexure of the S-shaped columns supporting the pad 54. The amount by which the pad 54 is lifted by each turn of the screw 52 depends, of course, upon the pitch of the screw, but also upon the difference between the cone angle of the screw head at the point of contact with the pad 54, and the angle of entry of the screw, the latter being subtractive from the former to reduce the ratio of lift to screw penetration for finer control of the adjustment.

The amount of extension of which the seating element 22 is in this manner capable depends upon its size, but the amount required in tooling made by today's exacting standards, to bring the face cutting edges 32 of all cutting inserts 24 into a common plane, is relatively slight, and readily accommodated by an extensibility of the insert seat of the order of five thousandths inches.

The configuration of the upper surface of the insert-engaging pad 54 will obviously depend upon the configuration of the adjacent surface of the insert. The insert 24 illustrated is a 4-position square insert indexable to four positions by rotating the insert about the central fastener hole therein. At each position, the insert displays a face-cutting edge 32 and a peripheral cutting edge 38.

That cutting edge configuration with desirable rake-face geometry is achieved in the illustrated case by dividing each insert side into two surfaces 61 and 63 at different angles to the flat faces of the insert with the upper surface of the insert-engaging pad 54 in contact with the insert surface 61 that it supports. The pad 54 is divided into two bosses 62, both engaged with the surface which happens to be on the underside of the insert 24 and supporting the face-cutting edge 32 of the insert with proper angular clearance irrespective of the position of adjustment of the pad 54.

The separation of the pad into two bosses 62 assures their solid engagement with the surface 61 in the high adjusted positions of the pad 54 by offsetting its tendency to bend upwardly under the force applied at its center by the adjusting screw 52.

Figure 11:
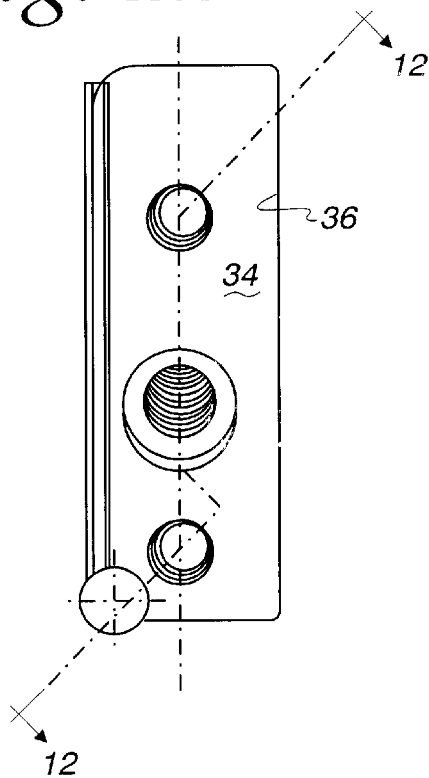
FIG. 11 is an enlarged elevational view of the pocket portion of the cutter body.
Figure 12:
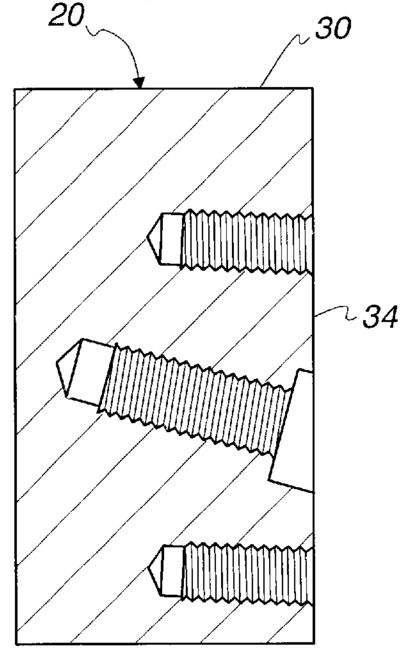
FIG. 12 is an enlarged fragmentary cross-section of the cutter body and pocket, taken on the bent line 12—12 of FIG. 11, showing, together with FIG. 11, the inclinations of the threaded holes in the cutter body for the attaching and adjusting screws.

The insert is held in the pocket 28 by a countersink headed fastener, in the illustrated case a screw 64, which is threaded into the cutter body at the same compound angle described in connection with the attaching screw 48 of the seating element, as also illustrated in FIGS. 11 and 12, to snug the cutting insert to the pad 54 of the insert seat and to the rear wall 42 of the pocket.

While most toolroom hands have their personal sequences for achieving a common cutting path for the face-cutting edge 32 of every insert, any sequence will typically involve the adjustment of multiple inserts determined by dial indicator, or equivalent measuring device, to be high or low beyond acceptable surface-finish tolerance. This requires loosening the insert fastener and readjusting the insert seat to raise or lower the insert before re-tightening the insert fastener and again checking the height of its edge. The insert seat of the present invention, with its resilient give and take, facilitates those adjustments without the multiple cut-and-try of every cutting edge that has characterized prior adjusting systems.

The building of the resilience into the insert seat or "nest" itself, independently of the body of the cutting tool, as in the present invention, also simplifies the design and manufacture of face mills.

The features of the invention believed new and patentable are set forth in the following claims.

What is claimed is:

1. In a face milling cutter having multiple cutting inserts each with a removable axially adjustable insert seat for positioning the cutting edge of each insert in a plane perpendicular to the rotational axis of the cutter and common to the cutting edges of all of the inserts thereof, and wherein each insert and its associated insert seat occupy a pocket in the periphery of the cutter, that is axially open at the face of the cutter, the improvement wherein:

each insert and insert seat adjoin each other in axially stacked relation abutting a wall of the pocket that is rearmost relative to cutting direction, with said insert seat also abutting a wall of the pocket remote from the face of the cutter;

said insert seat comprising a flat generally rectangular body of metal secured in said pocket in said abutting relation to said rearmost and remote walls by a screw threaded into the cutter body through the insert seat;

said insert seat at its side opposite said remote wall providing integrally with said seat an insert-engaging pad and resilient support therefor; and said insert seat also having a through hole receiving an adjusting screw threaded into the cutter body, said adjusting screw having a tapered barrel head aligned when threaded into the cutter body to wedge against said pad to shift the pad and the insert engaged thereby axially of the cutter by an amount determined by the penetration of the adjusting screw into the cutter body.

2. In a face milling cutter having multiple cutting inserts each with a removable axially adjustable insert seat for positioning the cutting edge of each insert in a plane perpendicular to the rotational axis of the cutter and common to the cutting edges of all of the inserts thereof, and wherein each insert and its associated insert seat occupy a pocket in the periphery of the cutter, that is axially open at the face of the cutter, the improvement wherein:

each insert and insert seat adjoin each other in axially stacked relation abutting a wall of the pocket that is rearmost relative to cutting direction, with said insert seat also abutting a wall of the pocket remote from the face of the cutter;

said insert seat comprising a flat generally rectangular body of metal secured in said pocket in said abutting relation to said rearmost and remote walls by a screw threaded into the cutter body through the insert seat;

said insert seat at its side opposite said remote wall providing integrally with said seat an insert-engaging pad and resilient support therefor;

said insert seat also having a through hole receiving an adjusting screw threaded into the cutter body, said adjusting screw having a tapered barrel head aligned when threaded into the cutter body to wedge against said pad to shift the pad and the insert engaged thereby axially of the cutter by an amount determined by the penetration of the adjusting screw into the cutter body; and the resilient support of said insert-engaging pad takes the form of a pair of spaced serpentine columns integral with said pad and flanking said through hole in the body of the insert seat.

3. The improvement of claim 2 wherein the tapered barrel head of the adjusting screw engages said pad to lift the pad by the turning of the adjusting screw inward while reducing the ratio of lift to screw penetration as the screw moves inwardly.

4. An adjustable insert seat for the cutting inserts of face milling cutters comprising:

a generally rectangular flat block of metal sized to share a peripheral pocket of a cutter body with an associated insert in abutting relation therewith stacked generally axially of the cutter body, both insert and insert seat being securable to the cutter body by attaching screws passing respectively through said insert and said insert seat, said flat block of metal having an attaching end portion to receive one of the attaching screws, an opposite end portion providing a pad conformable to its associated insert, and an intermediate portion providing resilient support for said pad, said attaching end portion having therein a through hole to receive a barrel headed screw having mating engagement with said attaching end portion and with said pad to force said pad away from said attaching end portion to alter the position of the associated cutting insert axially of the cutter body.

5. An adjustable insert seat for the cutting inserts of face milling cutters comprising:

a generally rectangular flat block of metal sized to share a peripheral pocket of a cutter body with an associated insert in abutting relation therewith stacked generally axially of the cutter body, both insert and insert seat being securable to the cutter body by attaching screws passing respectively through said insert and said insert seat, said flat block of metal having an attaching end portion to receive one of the attaching screws, an opposite end portion providing a pad conformable to its associated insert, and an intermediate portion providing resilient support for said pad, said attaching end portion having therein a through hole to receive a barrel headed screw having mating engagement with said attaching end portion and with said pad to force said pad away from said attaching end portion to alter the position of the associated cutting insert axially of the cutter body, the intermediate portion providing resilient support for said pad comprising a pair of resilient columns integral with said pad and said attaching end portion, respectively, and flanking said through hole in the attaching end portion, and said columns each being folded upon themselves in serpentine fashion so as to be resiliently and axially extensible in response to force exerted between said opposite end portion and said attaching portion tending to further separate said end portions.

6. The adjustable insert of claim 5 wherein each column is formed by a first incision of the flat block opening into the through hole and a second incision opening out of the flat block.

* * * * *